United States Patent Office 2,960,499
Patented Nov. 15, 1960

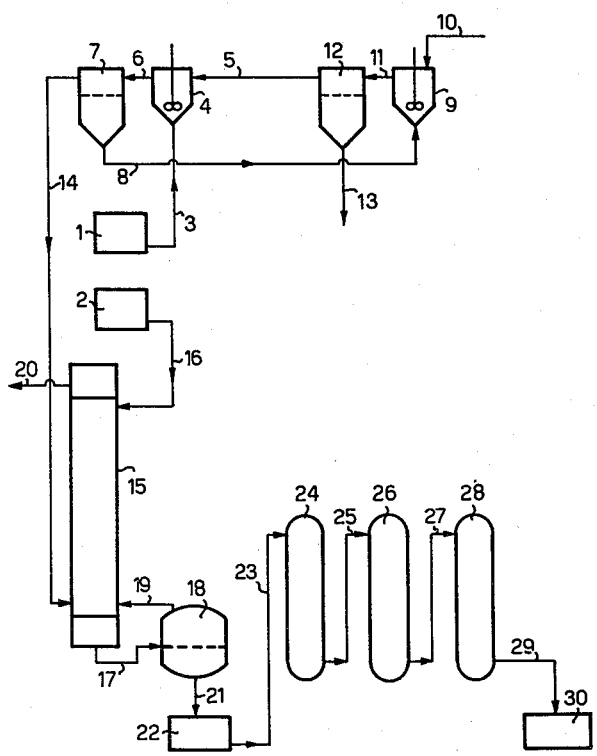

2,960,499

PREPARING A LACTAM CONTAINING LACTAM OLIGOMERS

Johannes W. P. Boon, Geleen, Netherlands, assignor to Stamicarbon N.V., Heerlen, Netherlands Filed Oct. 23, 1958, Ser. No. 769,123

Claims priority, application Netherlands Oct. 26, 1957

3 Claims. (Cl. 260—239.3)

The present invention relates to a process of preparing lactams containing lactam oligomers.

It is known that in the preparation of polyamides from lactams products are obtained which contain lactam and low molecular weight lactam oligomers built up of 2 to 5 lactam molecules. To remove these low molecular weight substances not desired in the final products, it is usual to wash the polyamides with water, either in unprocessed condition or after being processed into yarns, films or other products. In this process, large amounts of wash water are obtained containing lactam and lactam oligomers, mostly in a low concentration of from 1 to 4% by weight together with impurities. It is of importance to recover the lactam and the lactam oligomers from the wash water in a pure state.

It has already been proposed in United States Patent No. 2,758,991 to remove the impurities from aqueous lactam solutions by extraction with an organic solvent. It has also been proposed in United States Patent No. 2,828,307 to pass the aquous lactam solution over ion exchangers to remove the impurities. However, in practice, these processes for winning purified lactam and lactam oligomers from the wash water have the drawback that large quantities of water must be processed to obtain the valuable substances which are present in small quantities only.

United States Patent No. 2,758,991 also shows that in the purification of lactams from a lactam solution in an organic solvent which is not miscible or only slightly miscible with water, the lactam may be extracted with water, while the aqueous lactam solution obtained as extract may be subjected to a secondary treatment with a water-immiscible organic solvent.

It is an object of the present invention to provide a novel process for removing impurities from a mixture containing lactams and lactam oligomers.

Another object is to improve the procedure of water washing of impure lactams.

A futrher object is to obtain a more homogeneous lactam dispersion suitable for forming polyamides.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that lactams containing lactam oligomers are obtained if a lactam dissolved in an organic solvent which is not miscible or only slightly water-miscible is extracted therefrom with wash water obtained by washing polyamides prepared from lactams and the resulting aqueous lactam solution containing lactam oligomers is passed over ion exchangers.

The process according to the invention has the advantage that due to the use of wash water as extraction liquid the concentration of the lactam in the water increases considerably with the result that the processing of the wash water becomes attractive in practice. Because of this increase in the lactam concentration of the water the solubility of the lactam oligomers also increases, so that during the extraction the originally turbid water changes into a clear aqueous solution. As a result, no difficulties are experienced when this solution is subsequently passed over ion exchangers. Besides, lactams are obtained in which the oligomers present are dispersed to such an extent that the composition of the final products is homogeneous. This is of importance in the preparation of polyamides from the composition.

The lactam solution used as a starting material is a solution in an organic solvent which is not or only slightly water-miscible, e.g., a hydrocarbon, such as benzene, toluene, decahydronaphthalene, or cyclohexane, halogenated hydrocarbons, such as chloroform, perhalogenated hydrocarbons, such as carbon tetrachloride, and nitrohydrocarbons, such as nitromethane, or mixtures containing these substances. The concentration of the lactam in the solution may vary and usually a concentration of 10 to 40% by weight of lactam is used.

Not only lactams prepared from oximes, such as butyrolactam, valerolactam, caprolactam and oenantolactam, may be used as starting materials, but also there can be employed the depolymerization products of synthetic linear polyamides, e.g., the products obtained in practice by depolymerization of waste products obtained in polyamide (nylon) processing, such as waste yarns. These materials are processed preferably in this way to lactam products containing lactam oligomers.

The extraction of the lactam from the starting solution by means of the wash water which has been obtained by washing polyamides, may be carried out by the usual methods. When working by a continuous process, it is advisable to extract in a multiple countercurrent extraction system, a smooth extraction process being promoted by applying a temperature of from 30 to 50° C. The quantity of wash water with which the extraction process is carried out may be varied and preferably such as quantity is used that an aqueous solution containing 10 to 25% by weight of lactam is obtained. At this concentration the aqueous lactam solution can be easily further purified in a continuous process by passing the solution over ion exchangers.

Cation exchange resins which are suitable contain strong acid groups and include sulfonated monovinyl aromatic hydrocarbon-divinyl aromatic hydrocarbon copolymers and other sulfonated copolymers such as those mentioned in D'Alelion Patent No. 2,366,007 and sulfonated condensation products of phenols with aldehydes, e.g., sulfonated resorcinol-formaldehyde. Suitable anion exchangers for use in the present process are, for example, tertiary sulfonium bases of high molecular weight and quaternary ammonium bases of high molecular weight such as monovinyl aromatic compound-divinyl aromatic compound copolymer which has been chloromethylated and then reacted with a tertiary amine to form the quaternary ammonium compound which is treated with a strong alkali to form the free base. Typical examples of such quaternary ammonium polymeric bases are shown in McBurney Patent No. 2,591,573.

A supplementary purification treatment, e.g., with adsorption agents, such as activated carbon, is generally unnecessary but may, if desired, be included in a continuous purification system in a simple way.

After evaporative concentration of the purified aqueous lactam solution, lactam products containing lactam oligomers are obtained which do not discolor even after long storage, and from which valuable polymerization products can be prepared in the usual way.

The drawing illustrates the process in diagrammatic fashion.

*Example*

Crude E-caprolactam is used as the starting product. This is obtained by depolymerization of polyamide waste yarn built up from caprolactam. The crude lactam is contained in the storage vessel 1 in the form of 65% by weight aqueous lactam. The extraction liquid is wash water, obtained by washing polyamide yarn built up of caprolactam with water. The turbid wash water in storage vessel 2 contains 3% by weight of caprolactam and 0.5% by weight of caprolactam oligomers.

The vessels 1 and 2 are included in a continuous feed system, which is not indicated in the drawing.

From storage vessel 1, the aqueous caprolactam is passed through tube 3 to the mixing vessel 4, where it is mixed in the ratio of one to six by weight with a solution of caprolactam, 5% by weight in benzene, issuing from pipe 5. Through tube 6 the mixture is led into a separator 7 and separated therein into two phases. The aqueous phase is led through tube 8 to mixing vessel 9 and mixed therein with benzene supplied through tube 10. The mixture is passed through tube 11 to separator 12 and separated therein into two phases. The aqueous phase is discharged through line 13. The benzene phase, which contains the lactam extracted from the aqueous solution, is discharged through tube 5.

The benzene phase in separator 7, which contains 16% by weight of lactam, is passed through tube 14 to the extraction apparatus 15, into which also wash water from storage vessel 2 is fed through tube 16. The temperature in the extraction apparatus 15 is kept at 40° C. From the extraction apparatus 15 a liquid mixture is fed through tube 17 to a separator 18 and separated therein into two phases. The benzene phase is returned to the extraction apparatus 15 through tube 19. Through line 20, opening into the top of the extraction apparatus, impure benzene is discharged which is used again after purification and is led to tube 10.

The aqueous lactam solution containing lactam oligomers is fed from separator 18 to the buffer vessel 22 through tube 21. From the buffer vessel 22 the aqueous solution is fed through tube 23 into the top of column 24, which is filled with activated carbon; subsequently the solution is fed through tube 25 to column 26, which is filled with a cation exchanger, sulfonated styrene-divinyl benzene copolymer (Dowex 50), and next through tube 27 to column 28, which is filled with an anion exchanger, a quaternary ammonium compound made from a chloromethylated styrene-divinyl benzene copolymer by reaction with a tertiary amine and in the form of the free base (Dowex 2), from which column the purified lactam solution is passed to storage tank 30 through tube 29. The solution eventually obtained 21% by weight of caprolactam and 0.4% by weight of caprolactam oligomers.

In this way a final solution of 3060 g. (vessel 30) was obtained from 1000 g. of crude caprolactam (vessel 1) and 2500 g. of wash water (vessel 2).

Evaporation of the resulting solution yields caprolactam containing 2% by weight of caprolactam oligomers, from which the linear polyamide can be prepared.

Unless otherwise stated, all parts and percentages are by weight.

What is claimed is:

1. In a process for purifying caprolactam in which a solution of the caprolactam in an organic solvent is extracted with water and subsequently the aqueous caprolactam solution thus obtained is passed over an ion exchange resin, the improvement comprising carrying out the water extraction with an aqueous liquor containing lactam oligomers suspended therein, which aqueous liquor has been obtained by washing a caprolactam polyamide with water.

2. A process according to claim 1 wherein the extraction is carried out with sufficient water to obtain a 10 to 25% by weight aqueous caprolactam solution.

3. A process according to claim 2 wherein the aqueous extraction is carried out at a temperature of 30 to 50° C.

References Cited in the file of this patent

UNITED STATES PATENTS

| 2,731,081 | Mayner | Jan. 17, 1956 |
| 2,758,991 | Kretzers et al. | Aug. 14, 1956 |
| 2,786,052 | Kampschmidt | Mar. 19, 1957 |
| 2,828,307 | Soeterbrock et al. | Mar. 25, 1958 |
| 2,861,988 | England | Nov. 25, 1958 |

FOREIGN PATENTS

| 762,879 | Great Britain | Dec. 5, 1956 |
| 763,954 | Great Britain | Dec. 19, 1956 |

OTHER REFERENCES

Perry: Chemical Engineers Handbook, p. 715 (1950).